US012663550B2

(12) United States Patent
Iwabuchi

(10) Patent No.: US 12,663,550 B2
(45) Date of Patent: Jun. 23, 2026

(54) RADIATION IMAGING APPARATUS AND RADIATION IMAGING SYSTEM

(71) Applicant: CANON KABUSHIKI KAISHA, Tokyo (JP)

(72) Inventor: Yuki Iwabuchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 273 days.

(21) Appl. No.: 18/493,928

(22) Filed: Oct. 25, 2023

(65) Prior Publication Data

US 2024/0069222 A1 Feb. 29, 2024

Related U.S. Application Data

(63) Continuation of application No. PCT/JP2022/015718, filed on Mar. 29, 2022.

(30) Foreign Application Priority Data

May 17, 2021 (JP) ................................. 2021-083411
Mar. 28, 2022 (JP) ................................. 2022-052477

(51) Int. Cl.
| *G01T 1/24* | (2006.01) |
| *G01T 1/17* | (2006.01) |

(52) U.S. Cl.
CPC ................ *G01T 1/247* (2013.01); *G01T 1/17* (2013.01)

(58) Field of Classification Search
CPC ................................... G01T 1/247; G01T 1/17
See application file for complete search history.

(56) References Cited

U.S. PATENT DOCUMENTS

| 11,047,995 B2 | 6/2021 | Yagi |
| 11,128,820 B2 | 9/2021 | Tamura |
| 11,693,129 B2 | 7/2023 | Ishinari |
| 2003/0169850 A1 | 9/2003 | Kump |

FOREIGN PATENT DOCUMENTS

| JP | 2003-284710 A | 10/2003 | |
| JP | 2021-10653 A | 2/2021 | |
| JP | 2021-40195 A | 3/2021 | |
| JP | 2021-40196 A | 3/2021 | |
| JP | 2021040196 A | * 3/2021 | |
| WO | WO-2019208037 A1 | * 10/2019 | ............... G06T 7/00 |

* cited by examiner

*Primary Examiner* — Edwin C Gunberg
(74) *Attorney, Agent, or Firm* — VENABLE LLP

(57) ABSTRACT

A radiation imaging apparatus is provided. The apparatus includes a pixel array in which pixels are arranged, and a readout circuit configured to read out the signal from the pixel array, and configured to operate in a plurality of modes including a first mode and a second mode in which a time between imagings is longer than in the first mode. The readout circuit includes an integration amplifier configured to amplify the signal read out from the pixel array, and a sample and hold circuit configured to hold the signal amplified by the integration amplifier, the integration amplifier is configured to be able to switch a current driving capability for driving an input node of the sample and hold circuit, and the current driving capability in the first mode is higher than the current driving capability in the second mode.

16 Claims, 8 Drawing Sheets

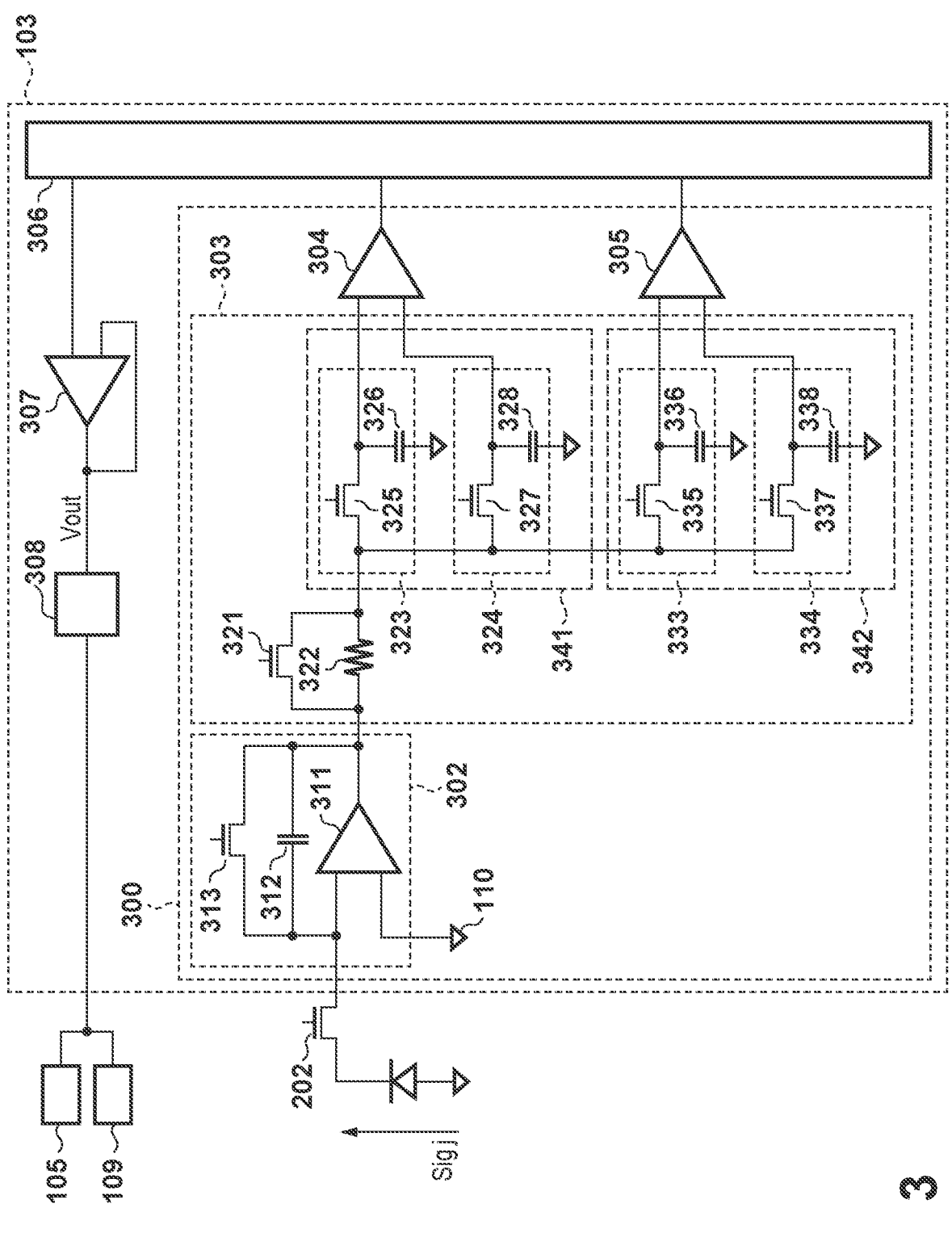
F I G. 3

F I G. 4A
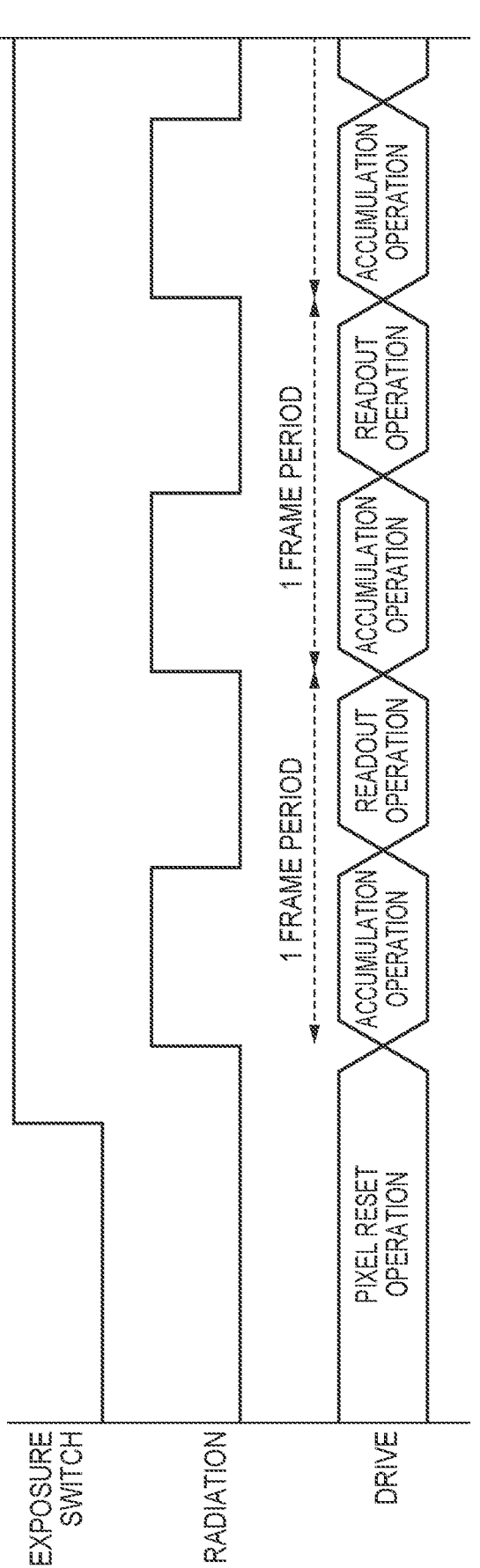

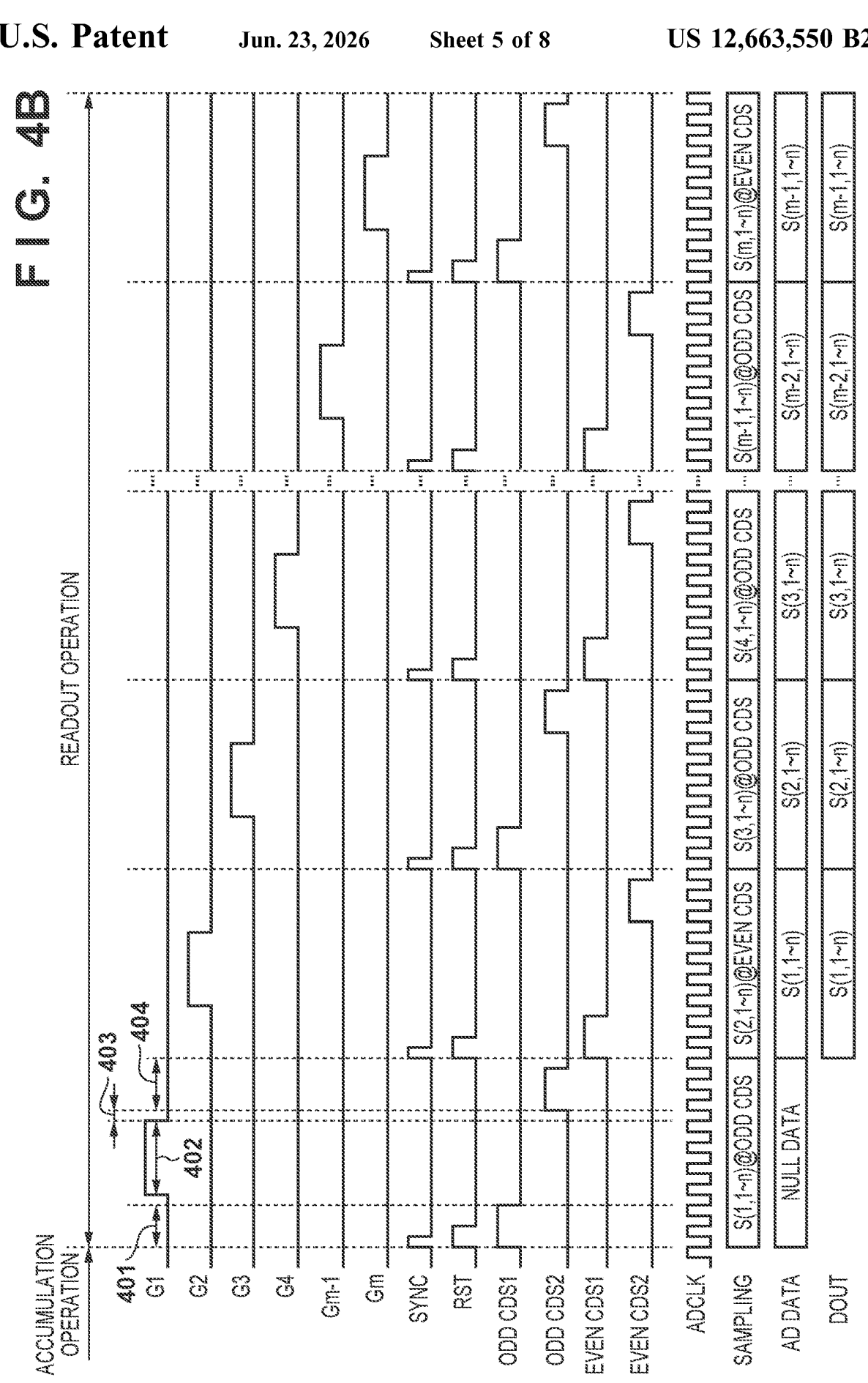
F I G. 4B

F I G. 7
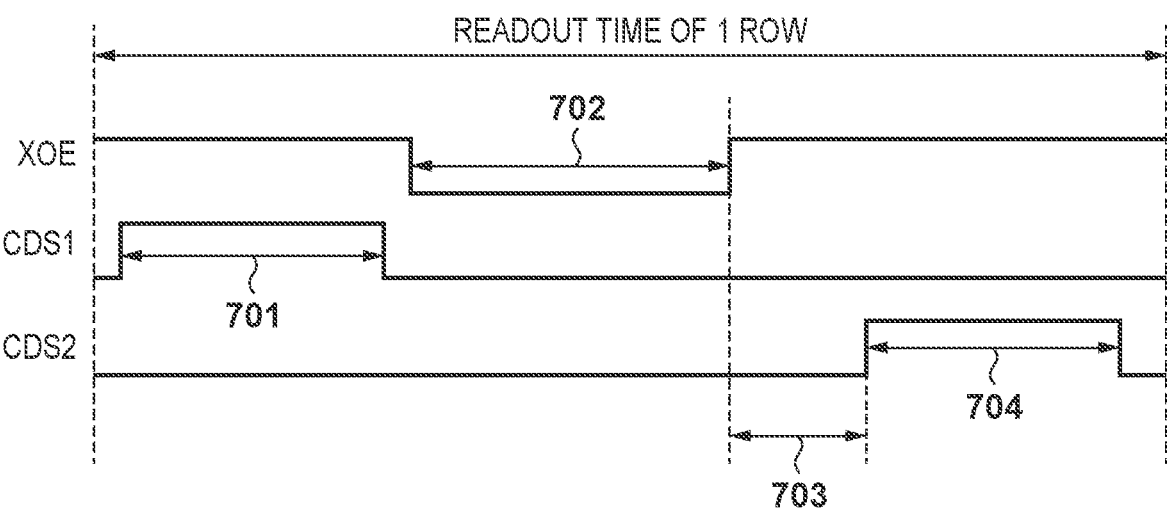

RADIATION IMAGING APPARATUS AND RADIATION IMAGING SYSTEM

CROSS-REFERENCE TO RELATED APPLICATIONS

This application is a Continuation of International Patent Application No. PCT/JP2002/015718, filed Mar. 29, 2022, which claims the benefit of Japanese Patent Applications No. 2022-052477, filed Mar. 28, 2022, and Japanese Patent Applications No. 2021-083411, filed May 17, 2021, all of which are hereby incorporated by reference herein in their entirety.

BACKGROUND OF THE INVENTION

Field of the Invention

The present invention relates to a radiation imaging apparatus and a radiation imaging system.

Background Art

In medical image diagnosis or nondestructive inspection, a radiation imaging apparatus using a flat panel detector (FPD) made of a semiconductor material is widely used. As one of imaging methods using an FPD, there is known a method of acquiring an energy subtraction image using radiation of different energy components. PTL 1 shows that in the first imaging of two continuous imaging processes, readout is performed in a mode with a low dose, a small dynamic range, and a low resolution, and in the second imaging, readout is performed in a mode with a high dose, a large dynamic range, and a high resolution. If the first imaging is performed by the readout in the mode with a small dynamic range and a low resolution, the time interval between the two imaging processes can be made short, and the motion artifact of an energy subtraction image caused by the body motion of an object can be reduced. PTL 1 also shows that even in a case where a lot of frames are acquired at a high speed, like tomosynthesis, the mode with a low dose, a small dynamic range, and a low resolution is used.

CITATION LIST

Patent Literature

PTL 1: Japanese Patent Laid-Open No. 2003-284710

It can be considered that one of two images acquired for an energy subtraction image or one of a lot of images acquired continuously for a moving image is used by a user for diagnosis. However, an image readout in the mode with a small dynamic range and a low resolution, as in PTL 1, may have insufficient image quality for diagnosis.

It is an object of the present invention to provide a technique advantageous for obtaining an image of excellent quality in a radiation imaging apparatus.

SUMMARY OF THE INVENTION

According to some embodiments, a radiation imaging apparatus comprising a pixel array in which a plurality of pixels each configured to generate a signal according to incident radiation are arranged, and a readout circuit configured to read out the signal from the pixel array, and configured to operate in a plurality of modes including a first mode and a second mode in which a time between imagings is longer than in the first mode, wherein the readout circuit comprises an integration amplifier configured to amplify the signal read out from the pixel array, and a sample and hold circuit configured to hold the signal amplified by the integration amplifier, the integration amplifier is configured to be able to switch a current driving capability for driving an input node of the sample and hold circuit, and the current driving capability in the first mode is higher than the current driving capability in the second mode, is provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a view showing an example of the configuration of the readout circuit of the radiation imaging apparatus shown in FIG. 1.

FIG. 4A is a timing chart for explaining the operation of the radiation imaging apparatus shown in FIG. 1.

FIG. 4B is a timing chart for explaining the operation of the radiation imaging apparatus shown in FIG. 1.

FIG. 7 is a view for explaining the operation of the radiation imaging apparatus shown in FIG. 1.

DESCRIPTION OF THE EMBODIMENTS

Figure 1:
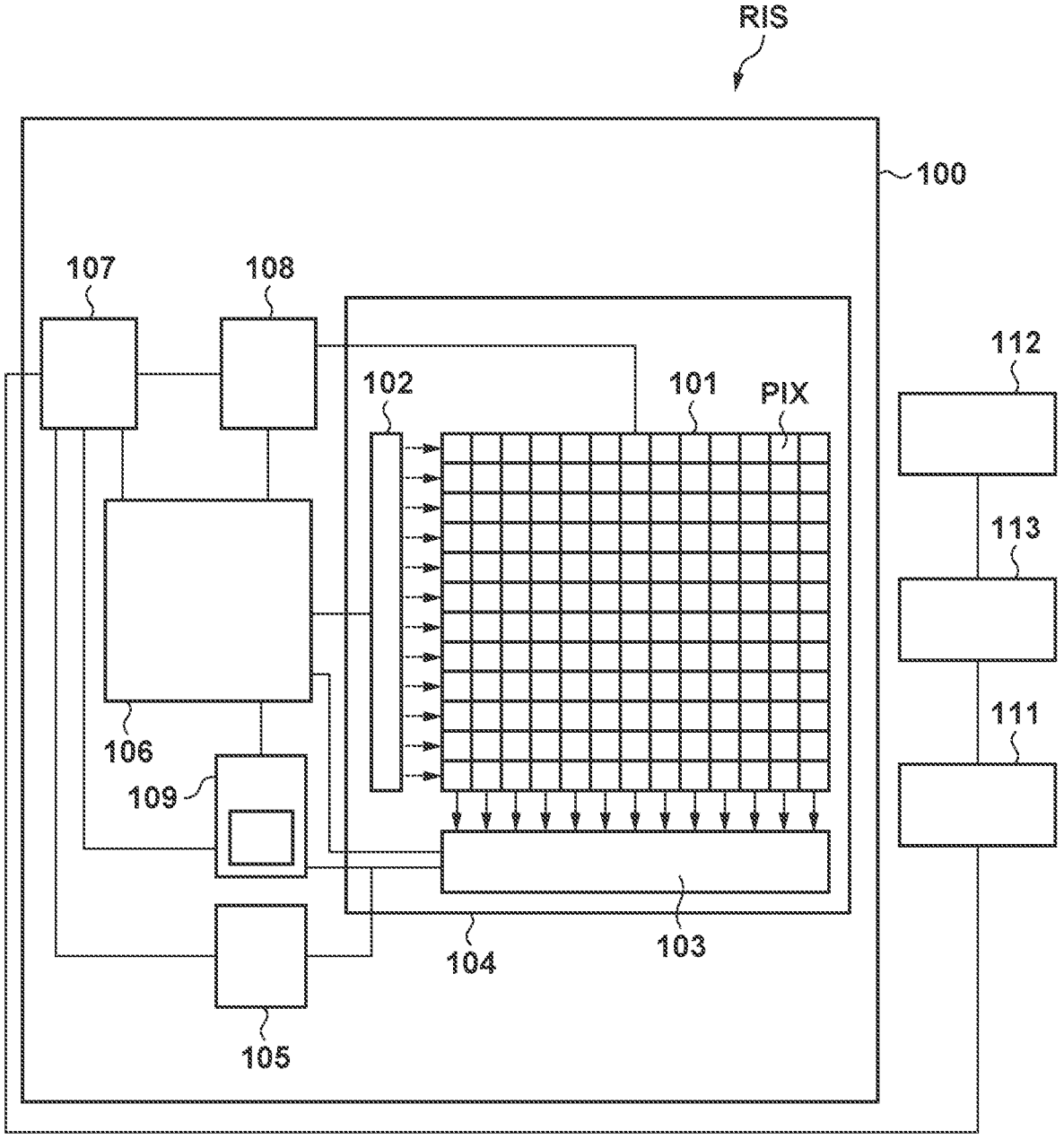
FIG. 1 is a block diagram showing an example of the configuration of a radiation imaging system using a radiation imaging apparatus according to the embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

Note that radiation according to the present invention includes not only α-rays, β-rays, and γ-rays that are beams generated by particles (including photons) emitted by radioactive decay but also beams having equal or more energy, for example, X-rays, particle rays, and cosmic rays.

The configuration and the operation of a radiation imaging apparatus according to this embodiment will be described with reference to FIGS. 1 to 7. FIG. 1 shows an example of the configuration of a radiation imaging system RIS (Radiology Information System) using a radiation imaging apparatus 100 according to this embodiment. The radiation imaging system RIS acquires a radiation image of an object by irradiating the object with radiation and detecting the radiation transmitted through the object. The radiation imaging system RIS includes, for example, the radiation imaging apparatus 100, a control device 111, a radiation source 112, and an exposure control device 113. The exposure control device 113 causes the radiation source 112 to generate radiation in accordance with an exposure instruction such as pressing of an exposure switch by the user. The control device 111 controls the radiation imaging apparatus 100 in accordance with an imaging condition set by the user, and the like. In addition, the control device 111 may function as a processor for image processing, which acquires a signal output from the radiation imaging apparatus 100 for a radiation image, and generates and processes an image to be displayed on a display device (not shown). Furthermore, the control device 111 controls the exposure control device 113 in accordance with an imaging condition set by the user, and the like.

The radiation imaging apparatus 100 can include an imaging unit 104 that captures a radiation image, a communication unit 107 that performs communication with the control device 111, a control unit 106 that control the imaging unit 104, and a power supply unit 108 that supplies power to the imaging unit 104. The radiation imaging apparatus 100 can also include an analysis unit 109 that analyzes an image output from the imaging unit 104, and a processing unit 105 that performs arithmetic processing of an image. Some of the constituent elements of the radiation imaging apparatus 100 may be incorporated in the control device 111, and the radiation imaging apparatus 100 and the control device 111 may be integrated. For example, in the configuration example shown in FIG. 1, the analysis unit 109 and the processing unit 105 arranged in the radiation imaging apparatus 100 may be incorporated in the control device 111.

The imaging unit 104 can include, for example, a pixel array 101, a scan circuit 102, and a readout circuit 103. In the pixel array 101, a plurality of pixels PIX each configured to generate a signal according to incident radiation are arranged to form a plurality of rows and a plurality of columns. The scan circuit 102 scans the pixel array 101 in accordance with a mode selected from a plurality of modes (imaging modes). The readout circuit 103 reads out signals from the pixel array 101. More specifically, the readout circuit 103 reads out signals from the pixels PIX on a row selected by the scan circuit 102 from the plurality of rows arranged in the pixel array 101. Reading out signals from the pixel array 101 can mean that the readout circuit 103 processes a signal output from each pixel PIX of the pixel array 101 and outputs signal data corresponding to the output signal.

Figure 2:
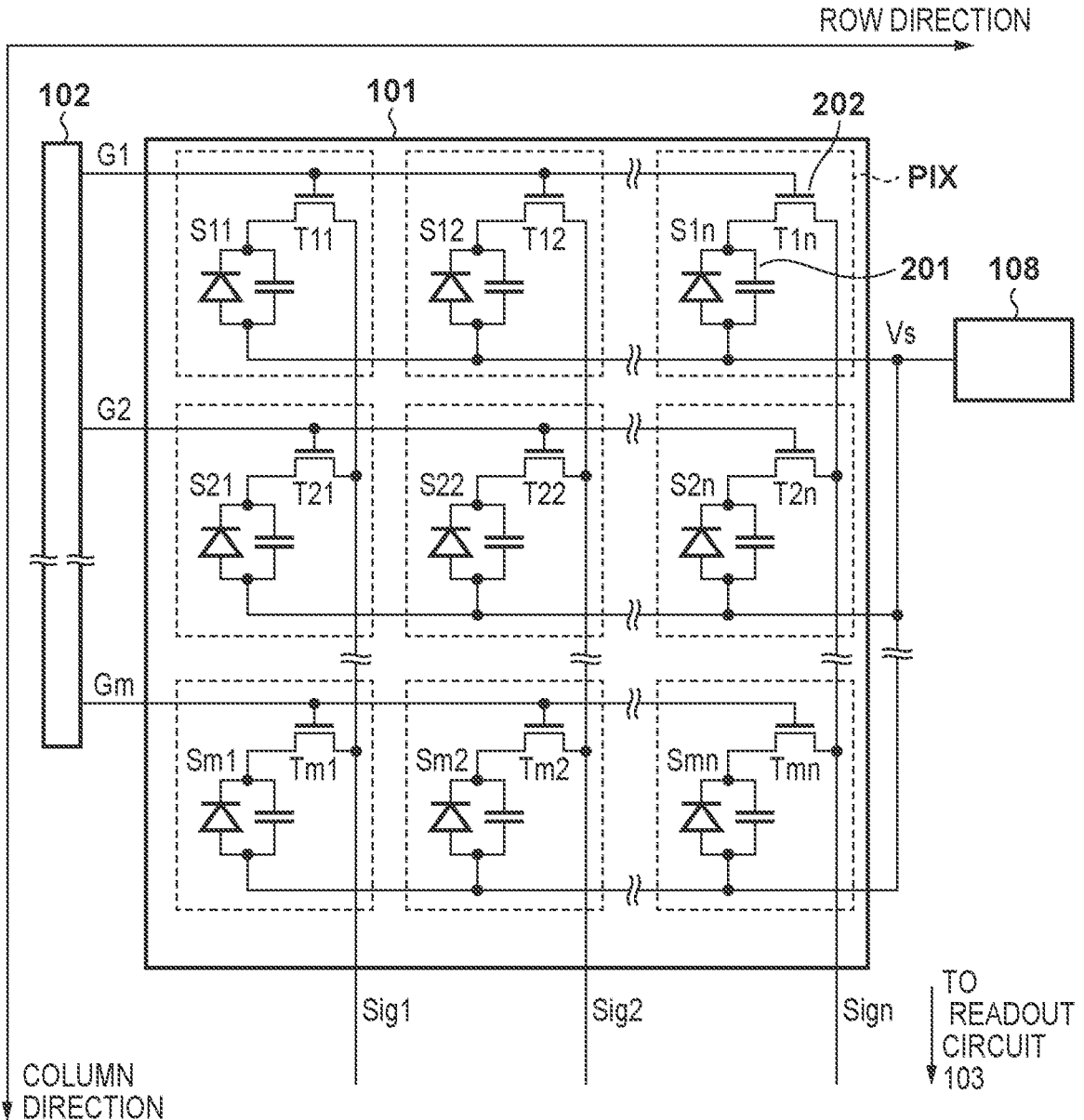
FIG. 2 is a view showing an example of the configuration of the pixel array of the radiation imaging apparatus shown in FIG. 1.

FIG. 2 shows an example of the configuration of the pixel array 101 of the radiation imaging apparatus 100. FIG. 3 shows an example of the configuration of the readout circuit 103 of the radiation imaging apparatus 100. Each of the plurality of pixels PIX includes a conversion element 201 that converts radiation or light into a signal (electric charges), and a switch element configured to output the generated signal to the readout circuit. In an example, the conversion element 201 is a photoelectric conversion element that converts light with which the conversion element 201 is irradiated into electric charges, and is a PIN type photodiode or a MIS type photodiode arranged on an insulating substrate such as a glass substrate and made of amorphous silicon as a main material. In this case, as the conversion element 201, a wavelength converter (scintillator) that converts radiation into light in a wavelength band detectable by the photoelectric conversion element can further be arranged. In this case, the conversion element 201 can be called an indirect type conversion element. Alternatively, a direct type conversion element that directly converts radiation into electric charges may be used as the conversion element 201.

As the switch element 202, a transistor including a control terminal and two main terminals, for example, a thin film transistor (TFT) can be used. One electrode of the conversion element 201 is electrically connected to one of the two main terminals of the switch element 202, and the other electrode of the conversion element 201 is electrically connected to the power supply unit 108 via a common bias line Vs. In FIG. 2, to discriminate the conversion elements 201 from each other, Sij (i is a row number, and j is a column number) is added to each conversion element 201. Additionally, to discriminate the switch elements 202 from each other, Tij (i is a row number, and j is a column number) is added to each switch element 202.

Control terminals of the switch elements 202 of the plurality of pixels PIX forming one row are connected to a driving line Gi (i is a row number) of the row. For example, control terminals of the switch elements 202 (T11 to T1$n$) of the plurality of pixels PIX forming the first row are electrically connected to a driving line G1 of the first row. Hence, the minimum unit of driving of the plurality of pixels PIX arranged in the pixel array 101 by the scan circuit 102 is the pixels PIX forming one row.

The other main terminal of the switch element 202 of each of the plurality of pixels PIX forming one column is connected to a signal line Sigj (j is a column number) of the column. For example, the main terminals of the switch elements 202 (T11 to Tm1) of the plurality of pixels PIX forming the first column are electrically connected to a signal line Sig1 of the first column. During a conductive state of the switch element 202, a signal according to the electric charges generated by the conversion element 201 is output to the readout circuit 103 via a signal line Sig. Each of the plurality of signal lines Sig1 to Sign is electrically connected to the readout circuit 103.

The readout circuit 103 includes a plurality of amplification circuits 300 that amplify a plurality of signals output in parallel from the pixel array 101 via the signal lines Sig1 to Sign. The plurality of amplification circuits 300 can be arranged in correspondence with the plurality of signal lines Sig, respectively. The amplification circuit 300 of the readout circuit 103 includes an integration amplifier 302 that amplifies a signal read out from the pixel array 101, and a sample and hold circuit 303 that holds the signal amplified by the integration amplifier 302. The amplification circuit 300 can further include a buffer amplifier 304 and a buffer amplifier 305. The buffer amplifier 304 and the buffer amplifier 305 buffer signals output from the sample and hold circuit 303.

The integration amplifier 302 can include, for example, an operation amplifier 311, a feedback capacitor 312, and a reset switch 313 which are arranged in parallel between the pixel array 101 and the sample and hold circuit 303. The operation amplifier 311 includes an inverting input terminal that receives a signal supplied via the signal line Sig, a noninverting input terminal that receives a reference voltage Vref from a reference power supply 110, and an output terminal. The feedback capacitor 312 and the reset switch 313 are arranged in parallel between the noninverting input terminal and the output terminal of the operation amplifier 311. The feedback capacitor 312 can have a variable capacitance value Cf. In other words, the feedback capacitor 312 is configured to be able to switch the capacitance value Cf.

The sample and hold circuit 303 includes a CDS circuit 341 and a CDS circuit 342 each of which performs correlated double sampling (CDS). The CDS circuit 341 includes a holding circuit 323 and a holding circuit 324, and performs CDS based on a signal supplied via the signal line Sig. The buffer amplifier 304 is formed by a differential amplifier, and differentially amplifies the output from the holding circuit 323 and the output from the holding circuit 324 and outputs these. The CDS circuit 342 includes a holding circuit 333 and a holding circuit 334, and performs CDS based on a signal supplied via the signal line Sig. The buffer amplifier 305 is formed by a differential amplifier, and differentially amplifies the output from the holding circuit 333 and the output from the holding circuit 334 and outputs these.

The holding circuit 323 can include a switch 325 and a capacitor 326. The holding circuit 323 performs processing by a low-pass filter formed by a resistance element 322 and the capacitor 326 for a signal supplied from the integration amplifier 302, and then holds the signal. The resistance element 322 can selectively be set enabled or disabled by a switch 321. The holding circuit 324 can include a switch 327 and a capacitor 328. The holding circuit 324 performs processing by a low-pass filter formed by the resistance element 322 and the capacitor 328 for a signal supplied from the integration amplifier 302, and then holds the signal. The resistance element 322 can selectively be set enabled or disabled by the switch 321.

Similarly, the holding circuit 333 can include a switch 335 and a capacitor 336. The holding circuit 333 performs processing by a low-pass filter formed by the resistance element 322 and the capacitor 336 for a signal supplied from the integration amplifier 302, and then holds the signal. The resistance element 322 can selectively be set enabled or disabled by the switch 321. The holding circuit 334 can include a switch 337 and a capacitor 338. The holding circuit 334 performs processing by a low-pass filter formed by the resistance element 322 and the capacitor 338 for a signal supplied from the integration amplifier 302, and then holds the signal. The resistance element 322 can selectively be set enabled or disabled by the switch 321.

In the configuration shown in FIG. 3, the two CDS circuits 341 and 342 are arranged in the sample and hold circuit 303. For example, a signal of the pixel PIX arranged in an odd-numbered row may be held by the CDS circuit 341, and a signal of the pixel PIX arranged in an even-numbered row may be held by the CDS circuit 342. The configuration of the sample and hold circuit 303 is not limited to the configuration shown in FIG. 3, and only one CDS circuit may be arranged. Also, three or more CDS circuits may be arranged in the sample and hold circuit 303. If the CDS is not executed in the readout circuit 103, only one set of a switch and a capacitor may be arranged in the sample and hold circuit 303.

The readout circuit 103 can further include a multiplexer 306, a buffer amplifier 307, and an A/D converter 308. The multiplexer 306 sequentially selects and outputs signals parallelly output from the plurality of amplification circuits 300. The buffer amplifier 307 impedance-converts the signal output from the multiplexer 306 and outputs it as signal data Vout of an analog electric signal. The A/D converter 308 converts the signal data Vout output from the buffer amplifier 307 into signal data of a digital electrical signal, and supplies it to the processing unit 105 and the analysis unit 109.

The above-described signal data detection is performed for each connected readout circuit 103 from the signal line Sig1 to the signal line Sign, thereby detecting an image signal of one row. This operation is repeated from the pixels PIX connected to the driving line G1 to the pixels PIX connected to a driving line Gm, thereby generating signal data of a digital image of the whole pixel array 101 of the radiation imaging apparatus 100.

The operation of the radiation imaging apparatus 100 will be described next with reference to FIGS. 4A and 4B. FIGS. 4A and 4B are timing charts for explaining the imaging operation of the radiation imaging apparatus 100. In this embodiment, the radiation imaging apparatus 100 performs the output operation of the pixels PIX on a row basis. Here, a period of one frame includes an accumulation period and a readout period. The accumulation period is a period in which an accumulation operation of causing each of the plurality of pixels PIX to accumulate signals (electric charges) according to irradiated radiation is performed. The readout period is a period in which a readout operation of sequentially scanning the plurality of rows (driving lines G) by the scan circuit 102 and reading out signals of one frame from the pixel array 101 by the readout circuit 103 is performed.

Also, the radiation imaging apparatus 100 repetitively performs a pixel reset operation until the user presses the exposure switch to perform radiation irradiation. The pixel reset operation is an operation of repetitively performing scanning on a row basis by the scan circuit 102 and resetting each pixel PIX arranged in the pixel array 101 of the radiation imaging apparatus 100, like the readout operation performed in the readout period.

If the user presses the exposure switch, the pixel array 101 is irradiated with radiation, and electric charges according to the irradiated radiation are generated in the conversion elements 201 (S11 to Smn). Next, the radiation imaging apparatus 100 starts the reset operation of the integration amplifier 302 of the readout circuit 103 to be described below. More specifically, a control signal RST is given from the control unit 106 to the reset switch 313, thereby resetting the feedback capacitor 312, and resetting the integration amplifier 302 that is a signal transmission path. Next, the reset switch 313 is set in a nonconductive state, thereby ending the reset operation. Here, the reset operation of the integration amplifier 302 is an operation during the time in which the reset switch 313 is maintaining the conductive state, and is an operation of returning the potential of the transmission path to a prescribed initial value.

Next, the radiation imaging apparatus 100 starts a noise component sample and hold operation to be described below. A control signal ODDCDS1 is supplied from the control unit 106 to the sample and hold circuit 303. According to the supply of the control signal ODDCDS1, the switch 325 of the holding circuit 323 of the CDS circuit 341 is set in the conductive state, and the noise component of the integration amplifier 302 is transferred from the reset integration amplifier 302 to the capacitor 326. Next, the switch 325 is set in the nonconductive state, and the noise component sample and hold operation is thus ended. Here, the noise component sample and hold operation is an operation during the time in which the switch 325 or the switch 335 is maintaining the conductive state.

Next, the radiation imaging apparatus 100 starts the output operation of the first row to be described below. Here, the start of the output operation of the first row is defined by the rise of a driving signal given from the scan circuit 102 to the driving line G1 of the first row, and the switch elements 202 (T11 to T1n) of the pixels PIX arranged on the first row are rendered conductive. When the switch elements 202 (T11 to T1n) are rendered conductive, analog electrical signals based on electric charges generated in the conversion elements (S11 to S1n) arranged on the first row are output from the pixels PIX to the readout circuit 103 via the signal lines Sig1 to Sign. Next, as the driving line G1 falls, the switch elements 202 (T11 to T1$n$) of the pixels PIX arranged on the first row are set in the nonconductive state, and the output operation from the pixels PIX is ended. In this embodiment, the output operation is an operation during the time in which the switch element 202 of each pixel PIX is maintaining the conductive state.

Next, the radiation imaging apparatus 100 starts a signal sample and hold operation to be described below. A control signal ODDCDS2 is supplied from the control unit 106 to the sample and hold circuit 303, and the switch 327 of the holding circuit 324 of the CDS circuit 341 is set in the conductive state. When the switch 327 is set in the conductive state, the signals of the pixels PIX arranged on the readout first row are transferred to the capacitor 328 via the integration amplifier 302. At this time, the noise component of the integration amplifier 302 is added to the signal output from the pixel PIX. Next, the switch 327 is set in the nonconductive state, and the signal added with the noise component is held by the capacitor 328. If the switch 327 is set in the nonconductive state, the signal sample and hold operation is ended. Here, the signal sample and hold operation is an operation during the time in which the switch 327 or the switch 337 is maintaining the conductive state.

When sampling of the signals is ended, the radiation imaging apparatus 100 starts a signal processing operation to be described below. The noise component held by the capacitor 326 and the signal of the pixel PIX of the first column added with the noise component and held by the capacitor 328 are input to the buffer amplifier 304 that is a differential amplifier. Next, a signal obtained by removing the noise component of the integration amplifier 302 is output from the buffer amplifier 304. After that, a signal obtained by removing the noise component and selectively transferred by the multiplexer 306 is supplied to the A/D converter 308 via the buffer amplifier 307. The A/D converter 308 converts the supplied signal of the pixel PIX on the first row and the first column into digital data S(1, 1), and outputs it to the processing unit 105 that processes the digitally converted signal data. The output operation of the signal of the pixel PIX on the first row and the second column is performed in parallel with the output operation of the signal on the first row and the first column. After the A/D conversion for the first row and the first column is executed, the signal of the pixel PIX on the first row and the second column is selectively transferred by the multiplexer 306. The signal of the pixel PIX on the first row and the second column is output as digital data S(1, 2) from the A/D converter 308 to the processing unit 105, like the signal of the pixel PIX on the first row and the first column. Similarly, the output operation of the signal data for the pixels PIX on the third column to the nth column of the first row is sequentially performed. With this signal processing operation, digital data S(1, 3) to S(1, n) are output as signal data to the processing unit 105, and the signal processing operation is ended. The signal processing operation here is performed during the time from the start of the reset operation of a certain row to the start of the reset operation for the row next to that row. That is, the signal processing operation for the pixels PIX on a certain row is performed temporally in parallel with the output operation of the pixels on the row to be operated next to that row.

Next, the reset operation, the noise component sample and hold operation, the output operation, the signal sample and hold operation, and the signal processing operation for the second row are performed, like the first row. For the third and subsequent rows as well, the same processing is repeated sequentially on a row basis, and signal data corresponding to all the pixels PIX of the pixel array 101 are output from the readout circuit 103.

The operation of acquiring a radiation image in the radiation imaging apparatus 100 has been described above. At this time, if the time from the end of the output operation from the pixel PIX along with the fall of the driving signal given to the driving line G to the start of the signal sample and hold operation is short, an image may include noise because of switching noise of the switch element 202. This is because at the time of fall of the driving signal given to the driving line G, the signal line voltage varies via a parasitic capacitance between the driving line G and the signal line Sig, and the signal sample and hold operation is started during the variation of the signal line voltage.

Figure 5:
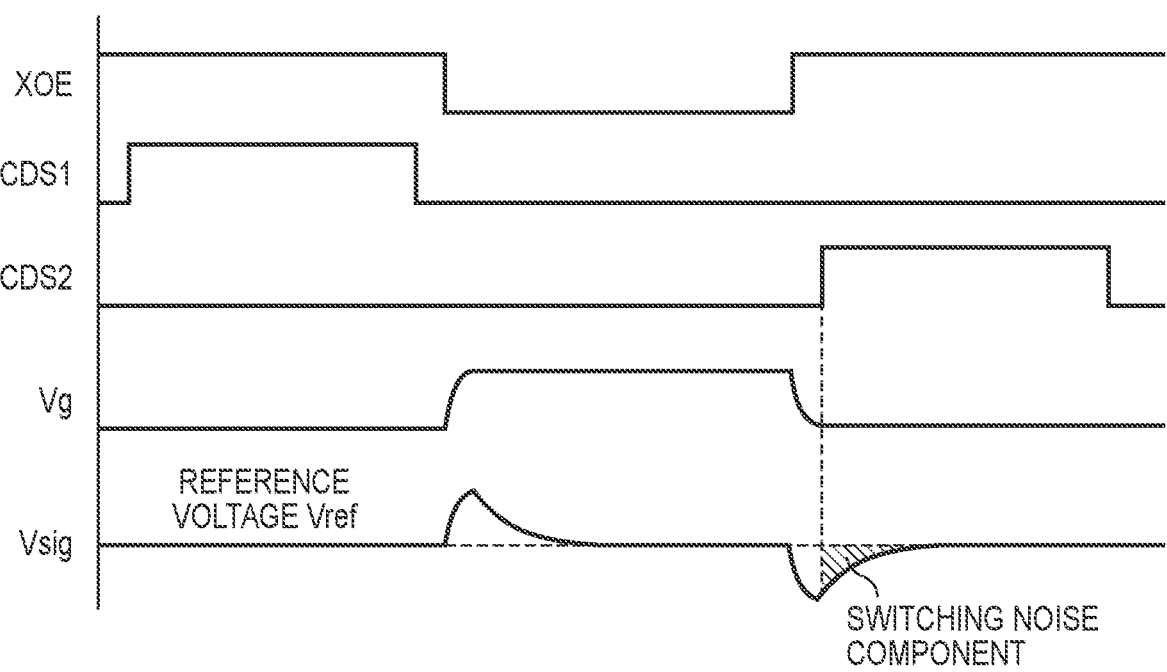
FIG. 5 is a view for explaining the operation of the radiation imaging apparatus shown in FIG. 1.

FIG. 5 shows a change of a signal line voltage Vsig of the signal line Sig when the switch element 202 changes between the conductive state and the nonconductive state. The signal line voltage Vsig is fixed to the same potential as the reference voltage Vref by the integration amplifier 302. However, if a driving signal Vg rises, and the switch element 202 is set in the conductive state, the voltage variation of the driving line G is transmitted to the signal line Sig via the parasitic capacitance between the driving line G and the signal line Sig, and the signal line voltage Vsig instantaneously becomes higher than the reference voltage Vref. After that, the signal line voltage Vsig is returned to the same potential as the reference voltage Vref by the integration amplifier 302.

Next, if the driving signal Vg falls, and the switch element 202 is set in the nonconductive state, the voltage variation of the driving line G is transmitted to the signal line Sig via the parasitic capacitance between the driving line G and the signal line Sig, and the signal line voltage Vsig instantaneously becomes lower than the reference voltage Vref. After that, the signal line voltage Vsig is returned to the same potential as the reference voltage Vref by the integration amplifier 302.

At this time, as shown in FIG. 5, consider a case where the signal sample and hold operation is started before the signal line voltage Vsig returns to the reference voltage Vref. This can be, for example, a case where when acquiring an energy subtraction image, considering the influence of a body motion, the signal sample and hold operation in the first imaging is started as early as possible to shorten the time interval between the first imaging and the second imaging. Alternatively, it can be, for example, a case where imaging is continuously performed to capture a moving image. In this case, in addition to the signal output from each pixel PIX of the pixel array 101, the switching noise component of the switch element 202 is sampled and held, and noise is added to an eventually obtained image. It was also confirmed by the experiments of the present inventor that if the time from the fall of the driving signal Vg supplied to the driving line G and the end of the output operation to the start of the signal sample and hold operation is made short, the influence of switching noise is readily added to an image.

This can be improved by improving the current driving capability of the integration amplifier 302 to drive the input node of the sample and hold circuit 303 and speeding up the response to the variation of the signal line voltage Vsig. It was confirmed by the experiments of the present inventor that if the current driving capability of the integration amplifier 302 is increased, the influence of switching noise on an image is reduced. Here, the current driving capability is defined as the capability of the integration amplifier 302 concerning how much current can be flowed to the output of the integration amplifier 302. That is, if the integration amplifier 302 can output more current to the input node of the sample and hold circuit 303, the current driving capability is high.

However, if the current driving capability of the integration amplifier 302 is uniformly improved independently of the imaging mode, the power consumption of the readout circuit 103, consequently, the power consumption of the radiation imaging apparatus 100 increases. If the power consumption of the radiation imaging apparatus 100 increases, in a case where, for example, a battery of the same capacity is used, the number of images that can be captured decreases. Also, for example, particularly in imaging executed to obtain still images one by one, it may be possible to appropriately ensure the time from the end of the output operation to the start of the signal sample and hold operation within a desired readout time per row without increasing the current driving capability of the integration amplifier 302. That is, it is not always necessary to improve the current driving capability of the integration amplifier 302.

Hence, in this embodiment, the radiation imaging apparatus 100 switches the current driving capability of the integration amplifier 302 between an imaging mode for performing acquisition of an energy subtraction image, acquisition of a BMD (Bone Mineral Density) image, or a plurality of continuous imaging processes for capturing a moving image and an imaging mode for acquiring one image such as a still image. More specifically, control is performed such that the current driving capability of the integration amplifier 302 in the mode for performing acquisition of an energy subtraction image, acquisition of a BMD image, or a plurality of continuous imaging processes for capturing a moving image becomes higher than the current driving capability in the mode for acquiring one image such as a still image. Hence, when capturing the same object continuously a plurality of times, a motion artifact or the like is reduced by shortening the readout time per row, and each image is obtained as a high-quality image that can be used for diagnosis because of suppressed influence of switching noise. Also, the mode for acquiring a still image or the like can be a mode in which power consumption is suppressed. Such switching of the current driving capability can be done by, for example, the control unit 106.

Here, acquisition of a BMD image is executed to quantitatively measure a bone mineral density. Hence, higher quantitativity is demanded as compared to "energy subtraction image capturing" in which an image that enhances only a specific structure such as a bone or a lung is generated/drawn from an image. For both a BMD image and an energy subtraction image, the readout time per row needs to be shortened to reduce a motion artifact or the like. The reason why a motion artifact is reduced in capturing of a BMD image is that if a motion artifact occurs, quantitative measurement accuracy may deteriorate. In two-shot imaging used to acquire an energy subtraction image or acquire a BMD image, in a BMD image that requires higher quantitativity, if the influence of switching noise (a change (difference) of a superimposed system noise amount caused by the difference of the signal readout timing) is added to the image, it may be impossible to guarantee the required measurement accuracy. Hence, even in the same two-shot imaging, acquisition of a BMD image may be controlled such that a motion artifact or the like is reduced by shortening the readout time per row, and the current driving capability becomes higher, as compared to acquisition of an energy subtraction image.

In this embodiment, the readout circuit 103 can control the output impedance of the integration amplifier 302, and can control the current driving capability of the integration amplifier 302. For example, if the output impedance of the readout circuit 103 is lowered, the current driving capability of the integration amplifier 302 can be increased.

The operation of the radiation imaging apparatus 100 for reducing switching noise of an image in accordance with an imaging mode will be described below. The radiation imaging apparatus 100 operates in a plurality of modes including a first mode for performing acquisition of an energy subtraction image or continuous imaging for capturing a moving image, and a second mode for capturing still images or the like at a longer time interval between imaging processes as compared to the first mode. Here, the integration amplifier 302 of the radiation imaging apparatus 100 is configured to switch the current driving capability for driving the input node of the sample and hold circuit 303. That is, the driving capability of the integration amplifier 302 is switched in accordance with the imaging mode. More specifically, the current driving capability of the integration amplifier 302 is switched such that the current driving capability in the first mode becomes higher than the current driving capability in the second mode.

As described above, the current driving capability of the integration amplifier 302 can be switched by controlling the output impedance of the integration amplifier 302. The output impedance of the integration amplifier 302 in the first mode is lower than the output impedance of the integration amplifier 302 in the second mode. Hence, in the first mode for performing acquisition of an energy subtraction image, acquisition of a BMD image, or capturing of a moving image, it is possible to suppress lowering of the quality of each obtained image while reducing the motion artifact by shortening the readout time per row. In the second mode for capturing a still image or the like, imaging with suppressed power consumption can be performed.

For example, the current driving capability of the integration amplifier 302 can be switched by switching the output impedance of the operation amplifier 311. In this case, the output impedance of the operation amplifier 311 in the first mode is lower than the output impedance of the operation amplifier 311 in the second mode. This enables the above-described control.

Also, for example, the current driving capability of the integration amplifier 302 can be switched by switching the capacitance value Cf of the feedback capacitor 312. In this case, the capacitance value Cf of the feedback capacitor 312 is switched such that the output impedance of the integration amplifier 302 in the first mode is lower than the output impedance of the integration amplifier 302 in the second mode. More specifically, the capacitance value Cf of the feedback capacitor 312 in the first mode is smaller than the capacitance value Cf of the feedback capacitor 312 in the second mode. This enables the above-described control.

Only the output impedance of the operation amplifier 311 or only the capacitance value Cf of the feedback capacitor 312 may be switched in accordance with the imaging mode. The output impedance of the operation amplifier 311 and the capacitance value Cf of the feedback capacitor 312 may be switched in accordance with the imaging mode. For example, consider a case where the radiation imaging apparatus 100 operates in three or more kinds of imaging modes. In this case, for example, in a mode in which the radiation imaging apparatus 100 operates at the highest speed (the time between imaging processes is short), the output impedance of the operation amplifier 311 and the capacitance value Cf of the feedback capacitor 312 may be switched. On the other hand, in a medium speed mode, one of the output impedance of the operation amplifier 311 and the capacitance value Cf of the feedback capacitor 312 may be switched. Switching of the output impedance of the operation amplifier 311 and switching of the capacitance value Cf of the feedback capacitor 312 are appropriately combined in accordance with the imaging mode.

A method of shortening the readout time per frame, in other words, the readout time per row in the radiation imaging apparatus 100 will be described here. FIG. 4B shows four elements for shortening the readout time per row. A period 401 is the time of the noise component sample and hold operation of sampling the noise component of the integration amplifier 302. A period 402 is the time of the output operation of making the driving signal Vg rise, setting the switch element 202 in the conductive state, and transferring a signal from the pixel PIX to the readout circuit 103. A period 403 is the time until the driving signal Vg falls, the switch element 202 is set in the nonconductive state, and the signal sample and hold operation is started, as described above. A period 404 is the time of sampling a signal by the signal sample and hold operation.

As described above, in the mode for performing imaging at a short time interval, to suppress the influence of the switching noise while shortening the time of the period 403, the radiation imaging apparatus 100 switches the current driving capability of the integration amplifier 302 (higher than in a case where a still image or the like is captured). However, the present invention is not limited to this, and in the mode for performing acquisition of an energy subtraction image, acquisition of a BMD image, or capturing of a moving image at a short time interval, the period 401, the period 402, and the period 404 may be shorter than in the mode for performing capturing of a still image or the like. For example, the times associated with the period 401, the period 402, and the period 404 can be made short by improving the current driving capability of the integration amplifier 302, as described above.

On the other hand, when capturing a still image or the like, the periods 401 to 404 need not be made short. Hence, to suppress power consumption and, for example, increase the number of images that can be captured, the radiation imaging apparatus 100 operates in a state in which the current driving capability of the integration amplifier 302 is low. Thus, in both a case where acquisition of an energy subtraction image, acquisition of a BMD image, or capturing of a moving image is performed and a case where a still image or the like is captured, a high-quality radiation image in which the influence of switching noise is suppressed can be obtained. Also, in a case where a still image or the like is captured, low power consumption of the radiation imaging apparatus 100 can be implemented.

Figure 6:
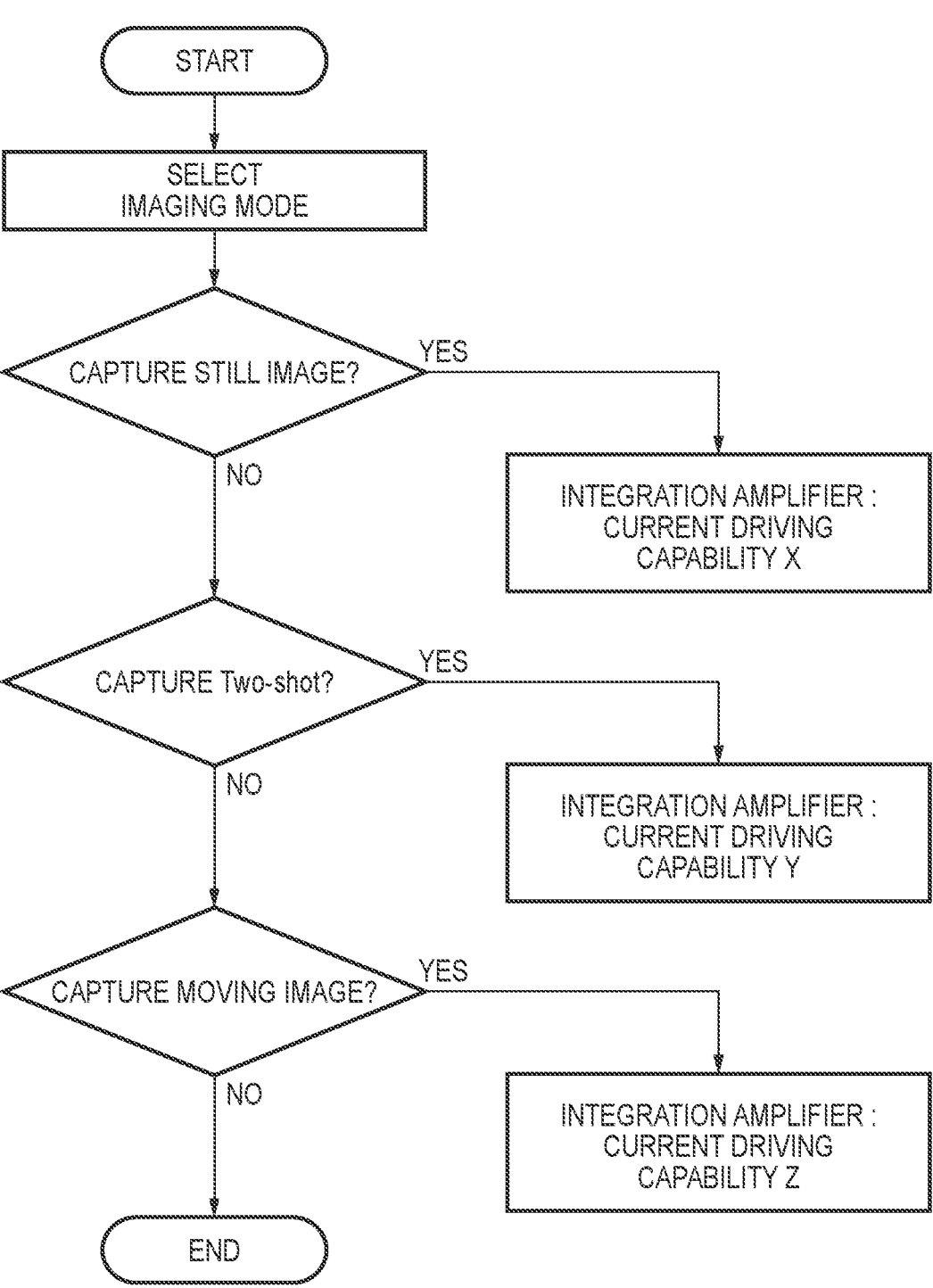
FIG. 6 is a flowchart for explaining the operation of the radiation imaging apparatus shown in FIG. 1.

A control method of the radiation imaging apparatus 100 for reducing switching noise of an image in accordance with an imaging mode will be described below. FIG. 6 shows an example of switching of the current driving capability of the integration amplifier 302 in accordance with an imaging mode. Here, a case where in the radiation imaging apparatus 100, three kinds of imaging modes including capturing of a still image (still image capturing), two-shot imaging performed to acquire an energy subtraction image or a BMD image, and capturing of a moving image (moving image capturing) are selectable is shown. Also, as for the current driving capability of the integration amplifier 302, current driving capability X<current driving capability Y<current driving capability Z holds, and the current driving capability Z is the highest capability of driving the input node of the sample and hold circuit 303. In other words, with the current driving capability Z, the amount of current that can be flowed from the integration amplifier 302 to the sample and hold circuit 303 is maximized.

As shown in FIG. 6, in the radiation imaging apparatus 100, to reduce the switching noise of an image, the current driving capability of the integration amplifier 302 may be increased in the order of still image capturing, two-shot imaging, and moving image capturing. In the two-shot imaging as well, as described above, the current driving capability of the integration amplifier 302 may be increased in the order of energy subtraction image acquisition and BMD image acquisition. As described above, for example, the current driving capability of the integration amplifier 302 may be increased by switching the output impedance of the operation amplifier 311. Also, for example, the current driving capability of the integration amplifier 302 may be increased by switching the capacitance value Cf of the feedback capacitor 312. Furthermore, for example, the current driving capability of the integration amplifier 302 may be increased by switching the output impedance of the operation amplifier 311 and the capacitance value Cf of the feedback capacitor 312.

The switching noise can also be reduced by switching the time from the end of the output operation to the start of the sampling operation, which is the period 403 shown in FIG. 4B. That is, if the time between the imaging processes is long, like still image capturing, the period 403 can be made long. On the other hand, in a case of acquisition of an energy subtraction image, acquisition of a BMD image, and moving image capturing, the shorter the length of the period 403 is, the shorter the time per frame can be. Hence, the length of the period 403 after the switch element 202 is set in the nonconductive state until the sampling operation is started in the period 403 can be set in accordance with the maximum value of the current driving capability of the integration amplifier 302.

A control method of the readout time per row according to the driving capability of the integration amplifier 302 will be described with reference to FIG. 7. As shown in FIG. 7, the readout time per row includes four elements, that is, a period 701 in which the noise component of the integration amplifier 302 is sampled, a period 702 in which the driving signal Vg rises to render the switch element 202 conductive and transfer a signal, a period 703 after the driving signal Vg falls to set the switch element 202 in the nonconductive state until the sampling operation is started, and a period 704 in which a signal is sampled.

As described above, the radiation imaging apparatus 100 switches the output impedance of the operation amplifier 311 or the capacitance value Cf of the feedback capacitor 312 and thus switches the output impedance of the integration amplifier 302, thereby controlling the current driving capability of the integration amplifier 302. If at least one of the operation amplifier 311 and the feedback capacitor 312 is controlled, the period 703 shown in FIG. 7 can variably be controlled long or short in accordance with the consequently obtained output impedance of the integration amplifier 302.

For example, the current driving capability of the integration amplifier 302 is increased. That is, at least one of lowering the output impedance of the operation amplifier 311 and lowering the feedback capacitor 312 of the integration amplifier 302 is controlled, thereby consequently lowering the output impedance of the integration amplifier 302. This makes it possible to shorten the length of the period 403 after the driving signal Vg falls to set the switch element 202 in the nonconductive state until the sampling operation is started, and obtain a desired readout time per row. For example, the time after the switch element 202 is rendered conductive to output a signal from the pixel PIX to the readout circuit 103 and then changes to the nonconductive state until the sample and hold circuit 303 samples the signal may be shorter in the mode for performing acquisition of an energy subtraction image, acquisition of a BMD image, or moving image capturing than in the mode for performing imaging such as still image capturing. In addition, in two-shot imaging used to acquire an energy subtraction image or acquire a BMD image, the time until the sample and hold circuit 303 samples the signal may be shorter in the order of acquisition of an energy subtraction image and acquisition of a BMD image.

In this case, if the current driving capability of the integration amplifier 302 is increased, the power consumption of the readout circuit 103 increases, and the power consumption of the radiation imaging apparatus 100 consequently increases. If the capacitance value Cf of the feedback capacitor 312 is too low, it may be impossible to obtain desired image quality (for example, SNR). If the fall of the driving signal Vg is caused within a range in which these balance, that is, desired power consumption and desired image quality can be obtained, the length of the period 403 after the switch element 202 is set in the nonconductive state, and the output operation is ended until the sampling operation is started, or the readout time per row decided by the period 403 can be controlled. Also, for example, the output impedance of the operation amplifier 311 or the capacitance value Cf of the feedback capacitor 312 may be controlled in accordance with the desired readout time per row or the desired length of the period 403, and the consequently obtained output impedance of the integration amplifier 302 may be controlled. At this time, the readout time per frame can be shortened by performing pixel addition in which the scan circuit 102 simultaneously drives a plurality of pixels PIX on a plurality of rows. In such pixel addition as well, the output impedance of the operation amplifier 311 or the capacitance value Cf of the feedback capacitor 312 is controlled in accordance with the desired readout time per row or the desired length of the period 403. The consequently obtained output impedance of the integration amplifier 302 may thus be controlled.

By the above-described means, there is provided a technique advantageous for obtaining an image of excellent quality in a radiation imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus, comprising:
a pixel array in which a plurality of pixels each configured to generate a signal according to incident radiation are arranged; and
a readout circuit configured to read out the signal from the pixel array, the readout circuit being configured to operate in a plurality of modes including a first mode and a second mode in which a time between imagings is longer than in the first mode;
the readout circuit comprising an integration amplifier configured to amplify the signal read out from the pixel array, and a sample and hold circuit configured to hold the signal amplified by the integration amplifier, wherein
the integration amplifier is configured to be able to switch a current driving capability for driving an input node of the sample and hold circuit,
the integration amplifier is configured to switch current driving capability in accordance with a mode selected from the plurality of modes, and
the current driving capability in the first mode is higher than the current driving capability in the second mode.

2. The radiation imaging apparatus according to claim 1, wherein the current driving capability is switched by switching an output impedance of the integration amplifier, and
the output impedance of the integration amplifier in the first mode is lower than the output impedance of the integration amplifier in the second mode.

3. The radiation imaging apparatus according to claim 1, wherein the integration amplifier comprises an operation amplifier and a feedback capacitor, which are arranged in parallel between the pixel array and the sample and hold circuit,
the current driving capability is switched by switching an output impedance of the operation amplifier, and
the output impedance of the operation amplifier in the first mode is lower than the output impedance of the operation amplifier in the second mode.

4. The radiation imaging apparatus according to claim 3, wherein the feedback capacitor is configured to be able to switch a capacitance value, and
the capacitance value is switched such that the output impedance of the integration amplifier in the first mode is lower than the output impedance of the integration amplifier in the second mode.

5. The radiation imaging apparatus according to claim 4, wherein the capacitance value of the feedback capacitor in the first mode is smaller than the capacitance value of the feedback capacitor in the second mode.

6. The radiation imaging apparatus according to claim 1, wherein the integration amplifier comprises an operation amplifier and a feedback capacitor, which are arranged in parallel between the pixel array and the sample and hold circuit,
the current driving capability is switched by switching a capacitance value of the feedback capacitor, and
the capacitance value is switched such that an output impedance of the integration amplifier in the first mode is lower than the output impedance of the integration amplifier in the second mode.

7. The radiation imaging apparatus according to claim 1, wherein each of the plurality of pixels comprises a switch element configured to output, to the readout circuit, the signal generated by each of the plurality of pixels, and
a time after the switch element is rendered conductive to output the signal from the pixel to the readout circuit and changes to a nonconductive state until the sample and hold circuit samples the signal is shorter in the first mode than in the second mode.

8. The radiation imaging apparatus according to claim 1, further comprising a control unit configured to control the readout circuit to switch the current driving capability, wherein the first mode is configured to capture at least one of a moving image, an energy subtraction image, and a bone mineral density image, and the second mode is configured to capture a still image.

9. The radiation imaging apparatus according to claim 1, wherein power consumption of the readout circuit in the first mode is larger than the power consumption of the readout circuit in the second mode.

10. The radiation imaging apparatus according to claim 1, wherein the plurality of modes further includes a third mode in which the time between imagings is shorter than in the first mode, and the current driving capability in the third mode is higher than the current driving capability in the first mode.

11. The radiation imaging apparatus according to claim 10, wherein the first mode is an imaging mode of an energy subtraction image, and the third mode is an imaging mode of a moving image.

12. The radiation imaging apparatus according to claim 10, wherein the first mode is an imaging mode of an energy subtraction image, and the third mode is an imaging mode of a bone mineral density image.

13. The radiation imaging apparatus according to claim 10, wherein the first mode is an imaging mode of a bone mineral density image, and the third mode is an imaging mode of a moving image.

14. The radiation imaging apparatus according to claim 1, wherein that the plurality of modes further includes a third mode in which the time between imagings is shorter than in the first mode, and a fourth mode in which the time between imagings is shorter than in the third mode, the current driving capability in the third mode is higher than the current driving capability in the first mode, and the current driving capability in the fourth mode is higher than the current driving capability in the third mode.

15. The radiation imaging apparatus according to claim 14, wherein the first mode is an imaging mode of an energy subtraction image, the third mode is an imaging mode of a bone mineral density image, and the fourth mode is an imaging mode of a moving image.

16. A radiation imaging system comprising:

the radiation imaging apparatus according to claim 1; and a processor configured to process a signal output from the radiation imaging apparatus.

* * * * *